United States Patent Office 3,222,891
Patented Dec. 14, 1965

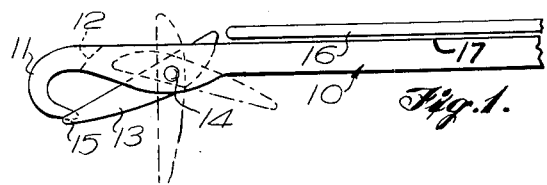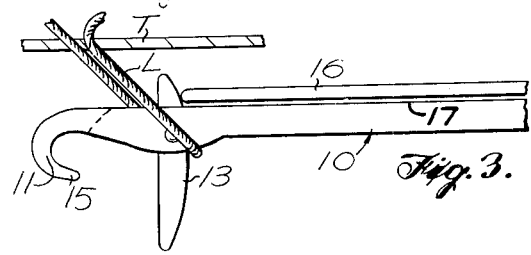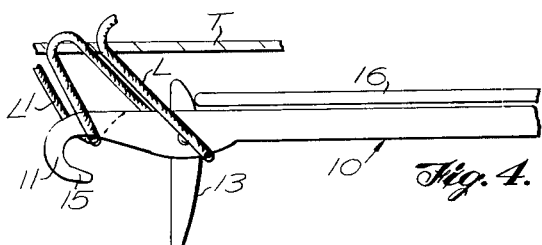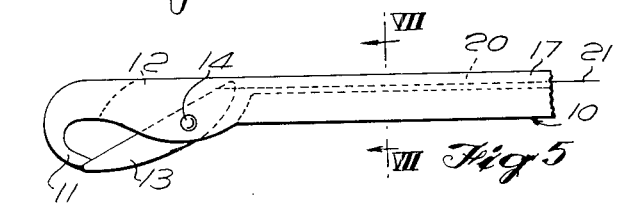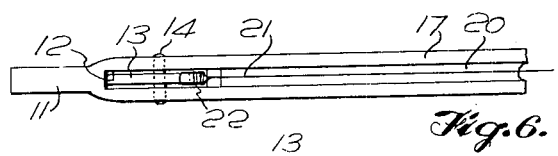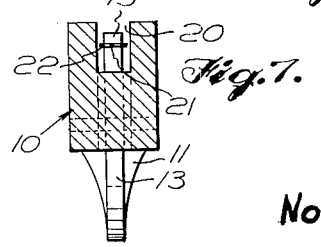

3,222,891
COMPOUND NEEDLE
Norman Wignall, Blackburn, England, assignor to Kintslaid Engineering Company Limited, a company of Great Britain and Northern Ireland and the Isle of Man
Filed Oct. 8, 1963, Ser. No. 314,782
Claims priority, application Great Britain, Oct. 9, 1962, 38,094/62
4 Claims. (Cl. 66—121)

This invention concerns a compound needle of the kind used in knitting, tufting or stitching machinery.

This application is a continuation in part to United States Patent Serial No. 241,782 filed December 3, 1962.

A conventional compound needle for example a loop pipe looper comprises a shank having a hook formed integrally therewith at one end thereof, and a loop separator pivoted to said shank at a position spaced from said hook and adapted to move from a position wherein the hook and separator in combination form a closed loop to a position wherein the hook is open. In use, the separator of such a looper is opened and closed as required by the action of the yarn and/or by a fine wire or brush, depending upon the function of the looper in the machine.

It has been shown that this rather indefinite means of controlling the separator of the looper imposes a limitation on the speed at which a machine incorporating the looper may operate.

It is an object of the present invention to provide a compound needle having a separator which may be controlled in a positive manner, thereby overcoming, at least to some extent, the disadvantage aforesaid, and making the needle very suitable in applications requiring one loop to be shed over another.

According to the invention a compound needle comprises a shank having a hook formed integrally therewith at one end thereof, a slot in said shank slightly spaced from and in the plane of said hook, and a loop separator pivotally mounted in said slot and adapted to pivot from a position wherein the hook and separator together form a closed loop to a position wherein said hook is open, characterised in that said separator extends on both sides of its pivot, whereby its end remote from said hook may co-operate with actuating means adapted for longitudinal movement with respect to said shank.

According to a preferred feature of the invention said shank is provided with a longitudinally extending groove on the side thereof remote from said hook, said actuating means and the end portion of said separator remote from said hook being located in said groove.

According to a further preferred feature of the invention said actuating means comprising a wire having a loop at one end thereof, said loop being located around the end of said separator remote from said hook, whereby both opening and closing of the hook may be positively controlled by operation of said actuating means.

Of the drawings:
FIG. 1 shows a side elevation of the first example
FIG. 2 shows a plan view of the needle of FIG. 1.
FIG. 3 shows one way in which the needle may operate;
FIG. 4 shows a further way in which the needle may operate, in order to shed one loop over another;
FIG. 5 shows a side elevation of a second example;
FIG. 6 shows a plan view of the needle of FIG. 5; and FIG. 7 shows a cross-sectional view on the line VII—VII of FIG. 5.

Referring now to FIGS. 1 and 2 of the drawings, the needle comprises a shank 10 having a hook 11 formed integrally therewith at one end thereof. A slot 12 is provided through the shank 10 at a position slightly spaced from and in the plane of the hook 11. A separator 13 is pivotally mounted within the slot 12 on a pin 14 which passes therethrough. The separator 13 has a small groove at 15 adapted to locate over the end of the hook 11. The separator 13 extends through both sides of the slot 12, and is adapted to move from a position (shown in full lines in FIG. 1) wherein the separator 13 and hook 11 together form a closed loop to the other positions (shown in broken lines in FIG. 1) wherein the separator 13 is spaced from the hook 11 leaving the latter open. The end of the separator 13 which protrudes from the slot 12 on the side thereof remote from the hook 11 is adapted to co-operate with a rod-like actuating member 16 which is adapted to move longitudinally over the surface 17 of the shank 10.

In use, the separator 13 may be controlled to open any desired position away from the hook 11 by movement of the actuating member 16 over the surface 17 of the shank 10 towards the hook 11, so as to bear against and press the protruding end of the separator 13 forwardly towards the hook 11. When the member 16 is retracted, the separator 13 becomes free to close against the hook 11.

In use the needle may be incorporated in a machine and may perform a number of functions, thus FIG. 3 shows the needle in use with the separator 13 in a dependent position spaced from the hook 11 by the action of the member 16 and holding a loop of yarn L which protrudes from a textile fabric T.

Referring now to FIG. 4, the needle is shown in use with the separator 13 in a like position to that, shown in FIG. 3, with a loop L held by the hook 11 in a loop L' held by the separator 13. Movement of the looper towards the right after retraction of the member 16 serves to shed the loop L' over the loop L, and it is envisaged that needles embodying the invention will be found most useful in applications of this kind.

An alternative and preferred form of compound needle embodying the invention will now be described with reference to FIGS. 5–7.

The needle has essentially the same construction as that of FIGS. 1 and 2, and like reference numerals are used to indicate like parts.

A groove 20 running longitudinally of the shank 10 is provided in the face 17 of the shank remote from the hook 11, and this groove is in communication with the slot 12. The end of the separator 13 remote from the hook 11 protrudes into the groove 20 but lies below the surface 17 of the shank 10.

In this example the actuating means comprise a wire 21 having a closed loop 22 formed integrally therewith at one end thereof. The loop 22 and wire 21 are disposed longitudinally within the groove 20 and the loop 22 is located around the end of the separator 13 remote from the hook 11.

It will be appreciated that movement of the wire 21 longitudinally in the groove 20 effects movement of the separator 13, and in this example both opening and closing of the hook can be controlled positively by operation of the actuating means.

The example just described and illustrated in FIGS. 5–7 has a great advantage in that the working parts of the needle are partially enclosed, and any danger of entanglement of such parts with yarn or the like in considerably reduced. For this reason, the needle of FIGS. 5–7 is particularly suitable for use on high speed knitting machines.

It will be appreciated that it is not intended to limit the scope of the invention to the above examples only, many variations such as might occur to one skilled in the art being possible, without departing from the principles of the invention.

Where a plurality of needles of the kind shown in FIGS. 1–4 are arranged in a row on a machine, a single actuating member 16 in the form of a plate extending over the shanks of all the loopers in a row may be used to control all the loopers simultaneously, such an arrangement being suitable only where all the needles of the row must be in a like state at any time in the machine cycle, as for example in certain kinds of weft knitting machine.

Where control of a multiplicity of needles individually and selectively is required, individual actuating members for each need must, of course, be provided.

What I claim is:

1. A compound needle comprising, a shank having a hook formed integrally with it at one end, the shank having a slot slightly spaced from and in the plane of the hook, a loop separator pivotally mounted in the slot and adapted to pivot from a position wherein the hook and separator together form a closed loop, to a position wherein the hook is open, characterized in that the separator has parts of it extending on both sides of its pivot, the ends of said separator extending laterally of said shank when said separator is at an angle to said shank, a movable actuator, the end part of the separator remote from the hook co-operating with said actuator, the actuator being adapted for longitudinal movement with respect to the shank, the end of said actuator being in contact with said separator from the closed position of said separator to a position of at least about 90° to said shank, said actuator effecting a positive controlled opening of the hook from its completely closed position to an open position wherein the separator is positioned perpendicular to the shank of the needle, and means for moving said separator independently of the movement of said needle.

2. A compound needle according to claim 5 wherein said slot extends through the entire section of said shank, and wherein said separator protrudes from the faces of said shank on both sides thereof, said actuating means comprising a rod-like member adapted for longitudinal movement over the surface of said shank oppositely disposed from said hook.

3. A compound needle according to claim 5 wherein said shank is provided with a longitudinally extending groove on the side thereof remote from said hook, said actuating means and the end portion of said separator remote from said hook being located in said groove.

4. A compound needle comprising a shank having a hook formed integrally with it at one end, the shank having a slot slightly spaced from and in the plane of the hook, a loop separator pivotally mounted in the slot and adapted to pivot from a position wherein the hook and separator together form a closed loop, to a position wherein the hook is open, characterized in that the separator has parts of it extending on both sides of its pivot, the ends of said separator extending laterally of said shank when said separator is at an angle to said shank, a movable actuator, the end part of the separator remote from the hook cooperating with said actuator, the actuator being adapted for longitudinal movement with respect to the shank, the end of said actuator being in contact with said separator from the closed position of said separator to a position of at least about 90° to said shank, said actuator effecting a positive controlled opeening of the hook from its completely closed position to an open position wherein the separator is positioned perpendicular to the shank of the needle, said shank being provided with a longitudinally extending groove on the side thereof remote from said hook, said actuating means and the end portion of said separator remote from said hook being located in said groove, said actuating means comprising a wire having a loop at one end thereof, said loop being located around the end of said separator remote from said hook, and is thereby in constant engagement with the separator whereby both opening and closing of the hook is positively controlled by operation of said actuating means.

References Cited by the Examiner

UNITED STATES PATENTS

| 1,163,296 | 12/1915 | Williams | 66—111 |
| 2,252,302 | 8/1941 | Morith | 66—121 X |
| 2,778,211 | 1/1957 | Rhoads | 66—120 |

FOREIGN PATENTS

| 10,317 | 1915 | Great Britain. |
| 12,811 | 1898 | Great Britain. |
| 863,199 | 3/1951 | Great Britain. |

JORDAN FRANKLIN, *Primary Examiner.*